United States Patent
Gorodyansky (10) Patent No.: US 7,895,297 B2
(45) Date of Patent: Feb. 22, 2011

(54) SYSTEM AND METHOD FOR ENABLING WIRELESS INTERNET ACCESS IN PUBLIC AREAS

(75) Inventor: David Gorodyansky, Sunnyvale, CA (US)

(73) Assignee: Anchorfree, Inc., Mountain View, CA (US)

( * ) Notice: Subject to any disclaimer, the term of this patent is extended or adjusted under 35 U.S.C. 154(b) by 461 days.

(21) Appl. No.: 11/687,600

(22) Filed: Mar. 16, 2007

(65) Prior Publication Data

US 2007/0192371 A1    Aug. 16, 2007

Related U.S. Application Data

(63) Continuation of application No. 11/292,187, filed on Nov. 30, 2005.

(60) Provisional application No. 60/683,441, filed on May 20, 2005.

(51) Int. Cl.
*G06F 15/16*    (2006.01)
*G06Q 40/00*    (2006.01)

(52) U.S. Cl. .......................... 709/219; 705/40

(58) Field of Classification Search .................. 709/219
See application file for complete search history.

(56) References Cited

U.S. PATENT DOCUMENTS

| | | | |
|---|---|---|---|
| 5,835,061 A | 11/1998 | Stewart | |
| 5,948,061 A | 9/1999 | Merriman et al. | |
| 6,317,761 B1 | 11/2001 | Landsman et al. | |
| 6,442,529 B1 * | 8/2002 | Krishan et al. | 705/14.52 |
| 6,452,498 B2 | 9/2002 | Stewart | |
| 6,539,375 B2 | 3/2003 | Kawasaki | |
| 6,754,833 B1 | 6/2004 | Black et al. | |
| 6,782,375 B2 | 8/2004 | Abdel-Moneim et al. | |
| 6,859,833 B2 | 2/2005 | Kirsch et al. | |
| 6,895,406 B2 | 5/2005 | Fables et al. | |
| 2001/0011264 A1 | 8/2001 | Kawasaki | |
| 2002/0024532 A1 | 2/2002 | Fables et al. | |
| 2002/0087335 A1 * | 7/2002 | Meyers et al. | 705/1 |
| 2002/0099605 A1 | 7/2002 | Weitzman et al. | |
| 2002/0120759 A1 * | 8/2002 | Faccin et al. | 709/230 |
| 2003/0014403 A1 | 1/2003 | Chandrasekar et al. | |
| 2003/0023687 A1 | 1/2003 | Wolfe | |
| 2003/0028451 A1 | 2/2003 | Ananian | |

(Continued)

OTHER PUBLICATIONS

Newcomb, Kevin, "Google Seeks Patent for Targeting Ads on Wi-Fi Hotspots," *ClickZ Internet Advertising News*, Mar. 24, 2006, Incisive Interactive Marketing LLC, www.clickz.com/news/print.php/3593971.

(Continued)

*Primary Examiner*—Jeffrey Pwu
*Assistant Examiner*—Noel Beharry
(74) *Attorney, Agent, or Firm*—Haynes and Boone, LLP; Pavel I. Pogodin (57) ABSTRACT

The computerized inventive system enables both the wireless internet service providers and conventional wired internet service providers to redirect users to partner websites through appropriate affiliate links and to enable the aforesaid service providers to participate in revenue sharing with internet content providers. Using the inventive methodology and the inventive system, the wireless internet service providers and conventional wired internet service providers are able to offer free internet services to general public and receive a share of the revenue earned by the content providers.

6 Claims, 4 Drawing Sheets

U.S. PATENT DOCUMENTS

| | | | |
|---|---|---|---|
| 2003/0046161 A1 | 3/2003 | Kamangar et al. | |
| 2003/0216930 A1 | 11/2003 | Dunham et al. | |
| 2003/0236709 A1* | 12/2003 | Hendra et al. | 705/26 |
| 2004/0039807 A1 | 2/2004 | Boveda De Miguel et al. | |
| 2004/0054805 A1* | 3/2004 | Sen et al. | 709/240 |
| 2004/0059708 A1 | 3/2004 | Dean et al. | |
| 2004/0215515 A1 | 10/2004 | Perry | |
| 2004/0224662 A1 | 11/2004 | O'Neil et al. | |
| 2004/0249713 A1 | 12/2004 | Gross | |
| 2004/0267610 A1* | 12/2004 | Gossett et al. | 705/14 |
| 2005/0076014 A1 | 4/2005 | Agarwal et al. | |
| 2005/0080771 A1 | 4/2005 | Fish | |
| 2005/0097107 A1 | 5/2005 | Burt et al. | |
| 2005/0097188 A1 | 5/2005 | Fish | |
| 2005/0097204 A1 | 5/2005 | Horowitz et al. | |
| 2005/0131762 A1 | 6/2005 | Bharat et al. | |
| 2005/0149396 A1 | 7/2005 | Horowitz et al. | |
| 2005/0165656 A1* | 7/2005 | Frederick et al. | 705/26 |
| 2005/0222989 A1 | 10/2005 | Haveliwala et al. | |
| 2006/0059043 A1 | 3/2006 | Chan et al. | |
| 2006/0059044 A1 | 3/2006 | Chan et al. | |
| 2006/0136372 A1 | 6/2006 | Schunemann | |

OTHER PUBLICATIONS

Fleishman, Glenn, "Google's Wi-Fi Patent May Face Wayport Challenges," *Wi-Fi Networking News*, Mar. 29, 2006, https://wifinetnews.com/archives/006431.html.

International Search Report dated Feb. 28, 2008 for International Application No. PCT/US06/07166.

International Search Report dated Sep. 9, 2008 for International Application No. PCT/US07/14976.

International Search Report dated Sep. 27, 2007 for International Application No. PCT/US06/07167.

Turker, Denis, "The Optimal Design of A Search Engine from an Agency Theory Perspective", In Working Papers of the Institute for Broadcast Economics, Article No. 125565, 22 pages, Publication Date: Aug. 2004, Retrieved from the Internet: <URL: http://www.uni-koeln.de/wiso-fak/rundfunk/pdfs/19104.pdf>.

International Search Report dated Sep. 28, 2008 for International Application No. PCT/US06/07031.

Zhu, Xiaolan et al., "Incorporating quality metrics in centralized/distributed information retrieval on the World Wide Web", In Proceedings of the 23$^{rd}$ Annual International ACM SIGIR Conference on Research and Development in Information, Athens, Greece, pp. 288-295, 2000, Retrieved from the Internet: <URL: http://www.ittc.ku.edu/obiwan/publications/papers/sigir2000susan.pdf>.

International Search Report dated Nov. 28, 2007 for International Application No. PCT/US06/46149.

* cited by examiner

SYSTEM AND METHOD FOR ENABLING WIRELESS INTERNET ACCESS IN PUBLIC AREAS

CROSS-REFERENCE TO RELATED PATENT APPLICATIONS

This Application is a continuation of application Ser. No. 11/292,187 filed Nov. 30, 2005, which claims priority from U.S. Provisional Application No. 60/683,441 filed May 20, 2005, the disclosures of which are incorporated herein by reference.

The present patent application is related to commonly owned co-pending patent applications entitled "COMPUTERIZED SYSTEM AND METHOD FOR ADVANCED ADVERTISING" and "METHOD AND APPARATUS FOR IMPLEMENTING SEARCH ENGINE WITH COST PER ACTION REVENUE MODEL," filed on the same day.

FIELD OF THE INVENTION

The present invention relates generally to networking technology and more specifically to a system and method for enabling wireless internet access in public locations.

DESCRIPTION OF THE RELATED ART

In the recent years several different types of wireless Internet service providers (WISPs) provide Wi-Fi services for most of today's 10,000 plus HotSpots in the U.S. But the high, $20.00 to $40.00 monthly subscription costs of most of these HotSpots limit their attractiveness to wide segments of population. As the result of that, HotSpot users represent less than a third of the nation's total 30.0M laptop users. Elimination of subscription fees would increase the WIFI user pool substantially.

On the other hand, major existing internet content providers offer profit-sharing partnerships to other internet entities to encourage such other entities to send users to the content provider's portals. If WI-FI providers were able to receive revenue from the aforementioned internet content providers, the need for the WISP to charge users subscription fees would have been substantially eliminated. Such revenue would be paid by the content providers to WI-FI service providers for enabling WI-FI users to access content providers' revenue-generation resources.

In accordance with a conventional partnership scheme, to differentiate the traffic coming from partner websites from all other internet traffic, the aforementioned content providers establish special entry points (hereinafter also referred to as "affiliate links") to their internet portals and assign those entry points to their partners. The partners direct user traffic from their own websites to the content provider websites using these entry points. The content providers, in turn, monitor how many users got forwarded by the participating partners through their respective entry points and distribute the revenue to the partners based on their usage.

Unfortunately, the technology does not exist that would permit the wireless service providers and conventional internet service providers to partner with internet content providers in accordance with the methodology described above. In particular, the internet service providers simply enable user's access to the internet and are unable to forward users to specific internet locations, such as described entry points.

SUMMARY OF THE INVENTION

The inventive methodology is directed to methods and systems that substantially obviate one or more of the above and other problems associated with conventional techniques for enabling conventional and wireless internet service.

One aspect of the inventive concept is a method, computer programming product and a computerized system for redirecting user request to a partner web service. The inventive system includes a central processing unit executing a proxy application and a database storing information on partner web services and associated affiliate links. The proxy application is operable to receive connection requests from network clients, and to determine if the received connection requests are associated with the partner web service on the internet. If the redirector subsystem determines that the received connection requests are associated with the partner web service, is redirects the received requests to the partner web service via an affiliate link.

In accordance with a feature of the invention, in response to redirection of the received connection request to the partner web service via an affiliate link, the partner web service provides a payment to the operator of the computerized system.

In accordance with another feature of the invention, providing a payment involves generating a payment record within the partner's system.

In accordance with yet another feature of the invention, a payment subsystem is provided, such that in response to redirection of the received connection request to the partner web service via an affiliate link, the payment subsystem authorizes a payment to the operator of the internet service provider hosting the at least one network client.

In accordance with yet another feature of the invention, a payment record database is provided, such that authorizing a payment involves generating a payment record and storing this record in the payment record database.

In accordance with yet another feature of the invention, a billing subsystem and a billing record database are provided, such that in response to redirection of the received connection request to the partner web service via an affiliate link, the billing subsystem generates a billing record to the partner web service and stores this record in the billing record database.

Another aspect of the inventive concept is a method for sharing revenue among internet service provider and internet content provider. In accordance with the inventive method, a partnership relationship is established between the internet service provider and internet content provider. The user requests from users hosted by the internet service provider are then redirected to the internet service provider via affiliate links. At least apportion of the revenue of the internet content provider is distributed to the internet service provider in accordance with the number redirected user requests.

In accordance with a feature of the invention, the revenue is distributed to the internet service provider by the operator of a redirecting service, which receives the revenue from the internet content provider.

In accordance with another feature of the invention, the operator of a redirecting service retains at least a portion of the received revenue.

Another aspect of the inventive concept is a method for providing a free wireless internet service. The inventive method involves providing users with infrastructure for wireless internet access. The aforesaid infrastructure is provided by an internet service provider. The inventive method further involves generating revenue from online activities of the users of the free wireless internet service by content, media, advertising or publisher companies; and sharing the generated revenue with the aforesaid internet service provider. Because of this revenue sharing, the internet service provider is able not to charge the users for the use of the wireless internet service and thereby offer the wireless internet service free or at a reduced rate.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

The inventive system enables both the wireless internet service providers and conventional wired internet service providers to use the aforesaid entry point mechanism to redirect users to partner websites and thereby to participate in shared content revenue partnerships with internet content providers. Using the inventive methodology and the inventive system, the wireless internet service providers and conventional wired internet service providers would be able to offer free internet services to users and receive a share of the revenue from the content providers. The inventive system connects Internet Service Providers (ISPs) to frequently accessed Internet content revenue and allows ISPs as well as individual Internet users to receive a share of online advertising and content revenues.

Figure 1:
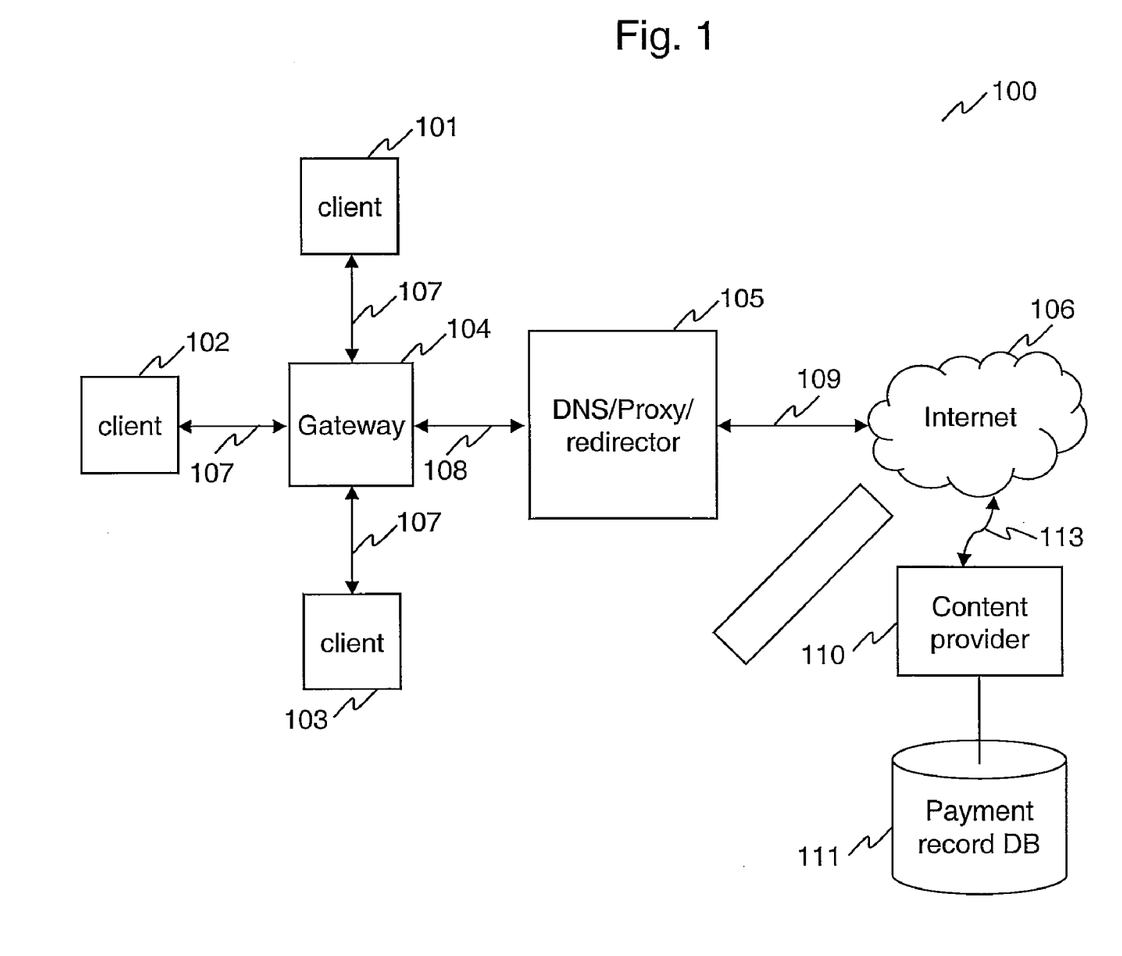
FIG. 1 depicts a conceptual block-diagram of an inventive network traffic processing configuration.

FIG. 1, illustrates an exemplary embodiment of the networking system employing the inventive concept. In that figure, network clients 101, 102 and 103 connect to the network via gateway 104 via connections 107, which may be either wireless or wired connection, or any combination thereof. The clients 101-103 and the gateway 104 may implement either wireless or wired connection protocols including 802.11a-e, well known in the art. The gateway 104 receives requests from the clients and forwards those requests to DNS/Proxy/Redirector 105, which monitors the user requests, determines if any of the user requests are directed to partner websites and, if so, redirects the matching user requests to the partner websites through appropriate affiliate links, triggering the payment routine of the associated content provider 110. To this end, the content provider 110 may have a payment records database 111, which is updated with a record specifying a payment to an affiliate, every time a user uses enters the content provider's website through the corresponding affiliate link. The content provider 110 makes periodic payments to its affiliates based on the information stored in the payment records database 111.

Figure 2:
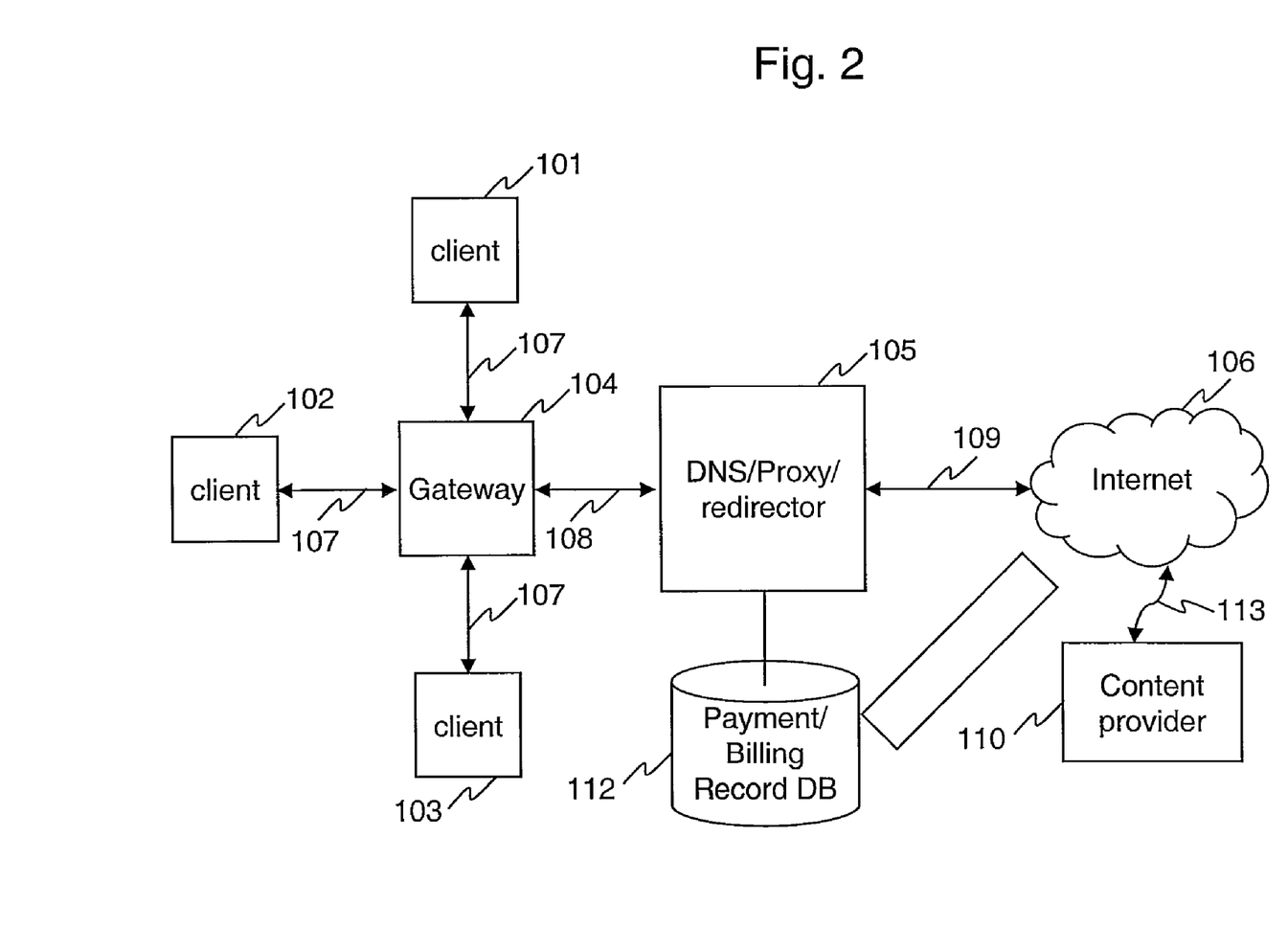
FIG. 2 depicts a conceptual block-diagram of an alternative embodiment of an inventive network traffic processing configuration.

In another embodiment of the inventive system, upon determining that the user requests to access a partner website, the inventive system redirects the user to the partner website through an appropriate affiliate link and generates a billing record to be sent to the partner content provider 110. For this purpose, an embodiment of the inventive system shown in FIG. 2 includes payment/billing record database 112, which stores all such records. All the other components and subsystems of the system shown in FIG. 2 are equivalent to the components of the system of FIG. 1, which are designated with the same numerals. In addition, the redirecting event could prompt the inventive system to record a credit to the appropriate internet service provider that hosted the requesting user. This credit information may also be stored in the payment/billing record database 112.

Figure 3:
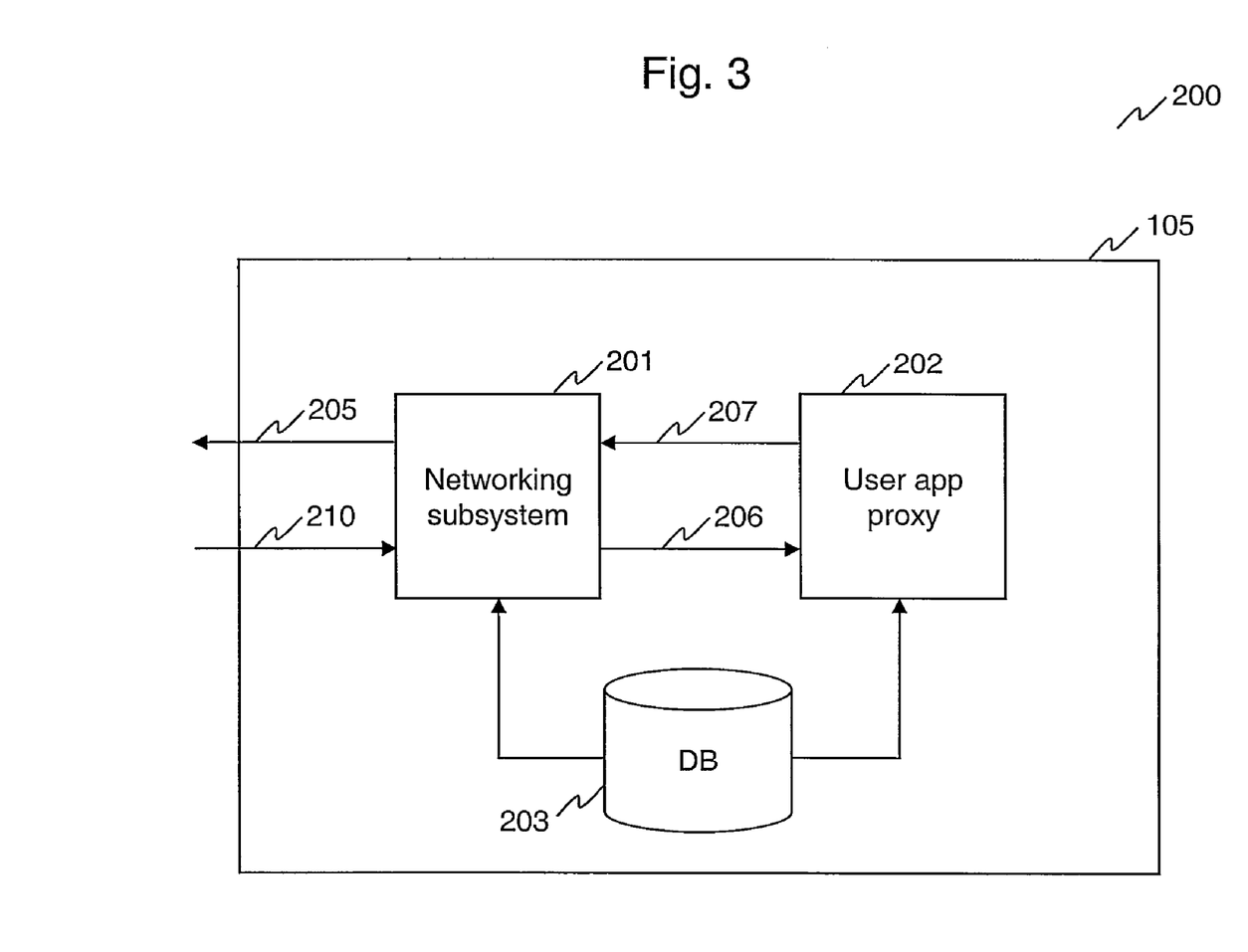
FIG. 3 depicts a conceptual block-diagram of an inventive traffic redirector module.

FIG. 3 illustrates an exemplary illustrative embodiment of the inventive DNS/Proxy/Redirector module 105. This module intercepts requests 204 sent by the internet service provider users and either simply transmits the requests without any modification or modifies the requests redirecting the user to the partner content provider through the designated affiliate links, thereby triggering the payment mechanism. The DNS/Proxy/Redirector module 105 includes networking subsystem 201 which handles the incoming and outgoing network traffic and forwards user requests to the proxy application 202, as shown by numeral 206. The proxy application 202 examines the content of the request to determine whether the request involves one or more of the resources of an affiliate content provider. For this purpose, the DNS/Proxy/Redirector module 105 includes a database 203, which stores information on the identity of the affiliate content providers. The proxy application 202 makes queries to that database to retrieve the matching content provider information.

If the user request is not directed to the affiliated provider, as determined by the proxy application, the DNS/Proxy/Redirector simply forwards the request to its intended destination, 207, 205. On the other hand, if the user request does contain matching partner information, the proxy application re-writes the request redirecting the user to the content provider through an appropriate affiliate link. The redirection information may be also stored in the database 203.

To enable the network connection route 108 between the internet service provider 114 and the inventive DNS/Proxy/Redirector 105, the internet service provider 114 and the DNS/Proxy/Redirector 105 must exchange their internet addresses and register them with one another. Once the address exchange is complete, the system begins filtering traffic. When users access participating content sites, the inventive software directs them thru the partnership/affiliate link provided by the partners, thus generating revenue. When users go to non-participating sites the software lets them thru without monetizing the traffic.

It will be appreciated by those of skill in the art that the inventive system is not limited to handling traffic from only one internet service provider. The inventive system is able to aggregate thousands of already developed Internet networks using a single network server.

As will be appreciated by persons of skill in the art, the inventive concept allows revenue collected by internet content providers to support the creation and expansion of metropolitan wireless access. The technology allows the aggregation of thousands of existing ISP/WISP networks and the expansion of these networks through the revenue generated from user traffic by frequently visited websites, including, without limitation, search engines, portals, resource centers, online services, entertainment & business media, publisher warehouses and other popular online locations.

Another embodiment of the invention involves a method for providing a free wireless internet service. The inventive method involves providing users with infrastructure for wireless internet access. The aforesaid infrastructure is provided by an internet service provider. The inventive method further involves generating revenue from online activities of the users of the free wireless internet service by content, media, advertising or publisher companies; and sharing the generated revenue with the aforesaid internet service provider. Because of this revenue sharing, the internet service provider is able not to charge the users for the use of the wireless internet service and thereby offer the wireless internet service free or at a reduced rate.

Figure 4:
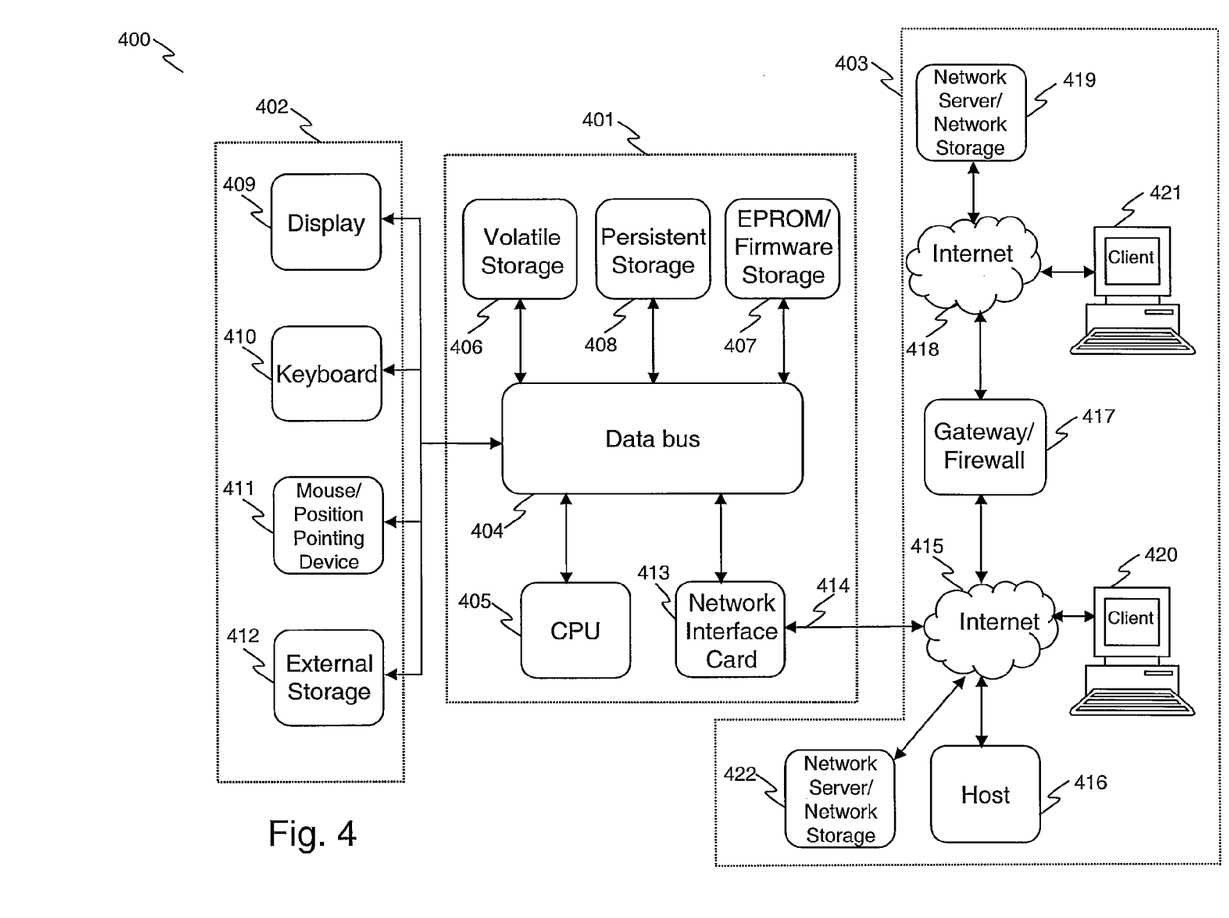
FIG. 4 illustrates an exemplary embodiment of a computer platform upon which the inventive content processing system may be implemented.

FIG. 4 is a block diagram that illustrates an embodiment of a computer/server system 400 upon which an embodiment of the inventive methodology may be implemented. The system 400 includes a computer/server platform 401, peripheral devices 402 and network resources 403.

The computer platform 401 may include a data bus 404 or other communication mechanism for communicating information across and among various parts of the computer platform 401, and a processor 405 coupled with bus 401 for processing information and performing other computational and control tasks. Computer platform 401 also includes a volatile storage 406, such as a random access memory (RAM) or other dynamic storage device, coupled to bus 404 for storing various information as well as instructions to be executed by processor 405. The volatile storage 406 also may be used for storing temporary variables or other intermediate information during execution of instructions by processor 405. Computer platform 401 may further include a read only memory (ROM or EPROM) 407 or other static storage device coupled to bus 404 for storing static information and instructions for processor 405, such as basic input-output system (BIOS), as well as various system configuration parameters. A persistent storage device 408, such as a magnetic disk, optical disk, or solid-state flash memory device is provided and coupled to bus 401 for storing information and instructions.

Computer platform 401 may be coupled via bus 404 to a display 409, such as a cathode ray tube (CRT), plasma display, or a liquid crystal display (LCD), for displaying information to a system administrator or user of the computer platform 401. An input device 410, including alphanumeric and other keys, is coupled to bus 401 for communicating information and command selections to processor 405. Another type of user input device is cursor control device 411, such as a mouse, a trackball, or cursor direction keys for communicating direction information and command selections to processor 404 and for controlling cursor movement on display 409. This input device typically has two degrees of freedom in two axes, a first axis (e.g., x) and a second axis (e.g., y), that allows the device to specify positions in a plane.

An external storage device 412 may be connected to the computer platform 401 via bus 404 to provide an extra or removable storage capacity for the computer platform 401. In an embodiment of the computer system 400, the external removable storage device 412 may be used to facilitate exchange of data with other computer systems.

The invention is related to the use of computer system 400 for implementing the techniques described herein. In an embodiment, the inventive management device DNS/Proxy/Redirector system 105 may reside on a machine such as computer platform 401. In an embodiment, the management device locator server 106 may also be deployed on a machine such as computer platform 401. According to one embodiment of the invention, the techniques described herein are performed by computer system 400 in response to processor 405 executing one or more sequences of one or more instructions contained in the volatile memory 406. Such instructions may be read into volatile memory 406 from another computer-readable medium, such as persistent storage device 408. Execution of the sequences of instructions contained in the volatile memory 406 causes processor 405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 405 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 408. Volatile media includes dynamic memory, such as volatile storage 406. Transmission media includes coaxial cables, copper wire and fiber optics, including the wires that comprise data bus 404. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 405 for execution. For example, the instructions may initially be carried on a magnetic disk from a remote computer. Alternatively, a remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on the data bus 404. The bus 404 carries the data to the volatile storage 406, from which processor 405 retrieves and executes the instructions. The instructions received by the volatile memory 406 may optionally be stored on persistent storage device 408 either before or after execution by processor 405. The instructions may also be downloaded into the computer platform 401 via Internet using a variety of network data communication protocols well known in the art.

The computer platform 401 also includes a communication interface, such as network interface card 413 coupled to the data bus 404. Communication interface 413 provides a two-way data communication coupling to a network link 414 that is connected to a local network 415. For example, communication interface 413 may be an integrated services digital network (ISDN) card or a modem to provide a data communication connection to a corresponding type of telephone line. As another example, communication interface 413 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 413 sends and receives electrical, electromagnetic or optical signals that carry digital data streams representing various types of information.

Network link 413 typically provides data communication through one or more networks to other network resources. For example, network link 414 may provide a connection through local network 415 to a host computer 416, or a network storage/server 417. Additionally or alternatively, the network link 413 may connect through gateway/firewall 417 to the wide-area or global network 418, such as an Internet. Thus, the computer platform 401 can access network resources located anywhere on the Internet 418, such as a remote network storage/server 419. On the other hand, the computer platform 401 may also be accessed by clients located anywhere on the local area network 415 and/or the Internet 418. The network clients 420 and 421 may themselves be implemented based on the computer platform similar to the platform 401.

Local network 415 and the Internet 418 both use electrical, electromagnetic or optical signals that carry digital data streams. The signals through the various networks and the signals on network link 414 and through communication interface 413, which carry the digital data to and from computer platform 401, are exemplary forms of carrier waves transporting the information.

Computer platform 401 can send messages and receive data, including program code, through the variety of network(s) including Internet 418 and LAN 415, network link 414 and communication interface 413. In the Internet example, when the system 401 acts as a network server, it might transmit a requested code or data for an application program running on client(s) 420 and/or 421 through Internet 418, gateway/firewall 417, local area network 415 and communication interface 413. Similarly, it may receive code from other network resources.

The received code may be executed by processor 405 as it is received, and/or stored in persistent or volatile storage devices 408 and 406, respectively, or other non-volatile storage for later execution. In this manner, computer system 401 may obtain application code in the form of a carrier wave.

It should be noted that the present invention is not limited to any specific types of wireless or wired network protocols. The requisite network configuration may be achieved using a variety of known networking protocols.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized networking system. It is intended that the specification and examples be considered as exemplary only, with a true scope and spirit of the invention being indicated by the following claims.

What is claimed is:

1. A computerized system for providing subsidized wireless internet service to a user, the system comprising:
   a. a plurality of wireless network gateways operable to establish a connection between a computer device of the user and a computer network and enable the user to access the computer network;
   b. a central processing unit executing a registration application and a proxy application, the registration application operable to cause the proxy application and the plurality of wireless network gateways to transmit its internet addresses to each other and register the internet address of the proxy application with the plurality of wireless network gateways, whereby the plurality of wireless network gateways forward user requests to the proxy application using the registered internet address of the proxy application, the proxy application automatically redirect the user who uses the wireless network gateway and who initiates a request for a partner merchant web service, the redirection being performed using an affiliate link;
   c. a database storing information on a plurality of partner merchant web services and its plurality of affiliate links used for redirection, the plurality of web services being provided by a plurality of partner merchants; and
   d. a payment application operable to initiate plurality of payments from the plurality of partner merchants to an operator of a wireless network gateway of the plurality of wireless network gateways, wherein:
      i. the proxy application is operable to receive at least one connection request from at least one network client, and to determine if the receiving at least one user connection request matches with the partner merchant web service on the internet;

ii. if the proxy application determines that the received at least one connection request matches with the partner web server, to automatically redirect the received at least one user connection request to the partner merchant web service via the affiliate link;

iii. each of the plurality of payments from each of the plurality of partner merchants is based on a number of times the user accessed the partner web services using the one of the plurality of wireless network gateway; and iv. wherein the plurality of partner merchants providing partner merchant web services to which the proxy application automatically redirects received user connection requests using the affiliate link collectively subsidize the providing of the wireless internet service to the user.

2. The computerized system of claim 1, wherein the response to redirection of the received at least one connection request to the partner web service via an affiliate link, the partner merchant associated with the partner web service provides a payment to the operator of the computerized system.

3. The computerized system of claim 2, wherein providing a payment comprises generating a payment record within the partner's system.

4. The computerized system of claim 1, wherein the partner web service comprises a payment subsystem, wherein in response to redirection of the received at least one connection request to the partner web service via an affiliate link, the payment subsystem authorizes a payment to the operator of the one of the plurality of wireless network gateways.

5. The computerized system of claim 4, further comprising a payment record database, wherein authorizing a payment comprises generating a payment record and storing this record in the payment record database.

6. The computerized system of claim 1, further comprising a billing subsystem and a billing record database, wherein in response to redirection of the received at least one connection request to the partner web service via an affiliate link, the billing subsystem generates a billing record to the partner web service and stores this record in the billing record database.

* * * * *